March 29, 1960 R. E. McNAMARA 2,930,453
COMPLETE SURFACE CONTACT BRAKE
Filed Aug. 16 1955 2 Sheets-Sheet 1

INVENTOR.
RUSSELL E. McNAMARA
BY
ATTORNEYS

March 29, 1960 R. E. McNAMARA 2,930,453
COMPLETE SURFACE CONTACT BRAKE
Filed Aug. 16 1955 2 Sheets-Sheet 2
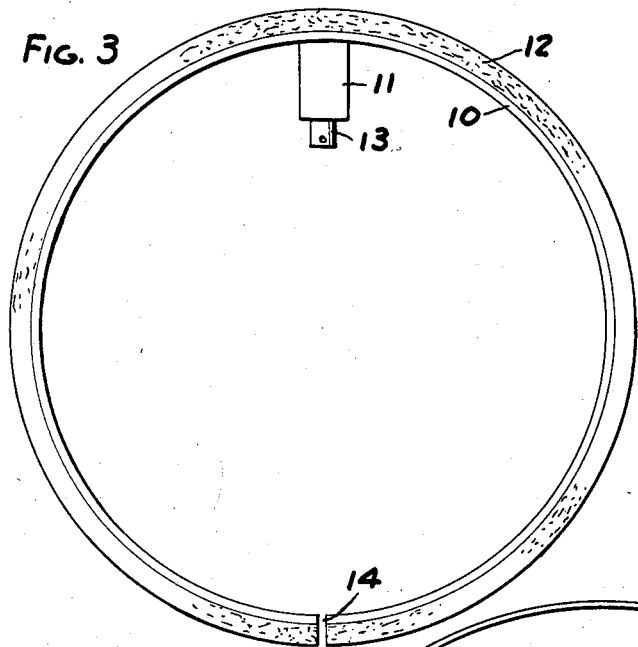
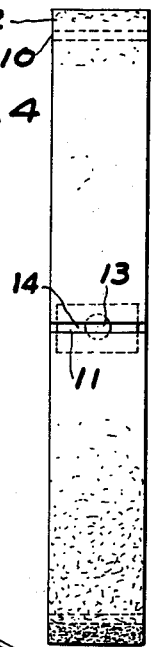
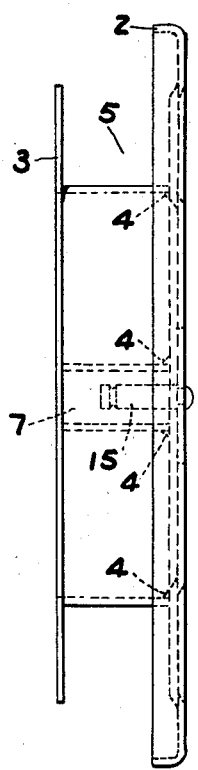
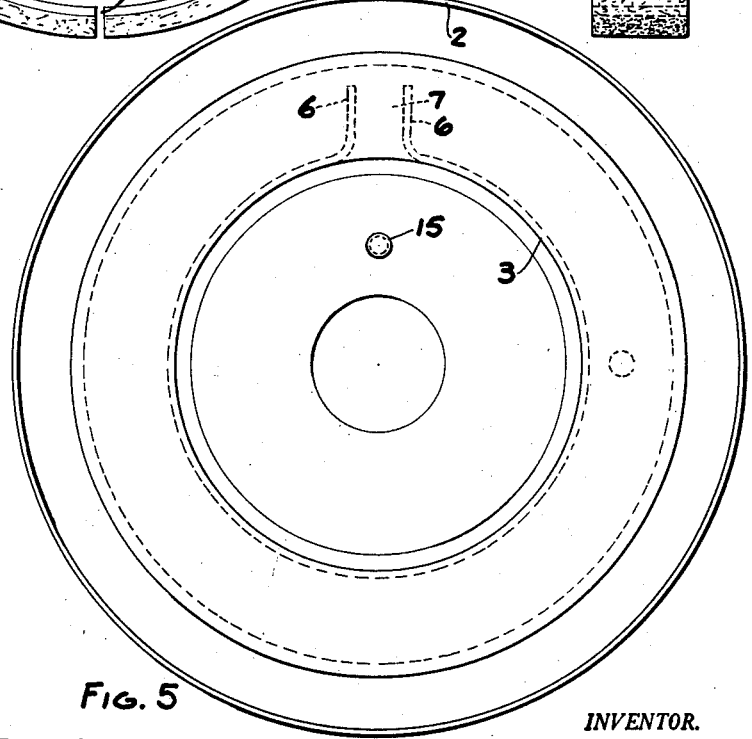
INVENTOR.
RUSSELL E. McNAMARA
BY
ATTORNEYS United States Patent Office 2,930,453
Patented Mar. 29, 1960

2,930,453
COMPLETE SURFACE CONTACT BRAKE
Russell E. McNamara, Riverside, Ontario, Canada
Application August 16, 1955, Serial No. 528,574
2 Claims. (Cl. 188—78)

This invention relates to a brake for automobiles and other power-driven equipment and has for its object the provision of a brake of unique design wherein there is practically 100% braking surface contact of the brake lining on the braking surface thereby increasing the efficiency of the brake and prolonging the life of the brake lining. This inventor's experience has been that present brakes have relatively small percentage of braking surface contact. The invention is intended for one brake or a series of brakes and is adapted to be operated by hand, foot or electrical device to actuate a fluid brake applying mechanism.

In general, the brake applying mechanism includes a fluid expansible member arranged within an outwardly opening annular channel on a brake supporting plate and arranged when expanded to bear against and expand a brake lining member against the braking surface of a brake drum.

The drawings which illustrate embodiments of the invention are as follows:

Fig. 3 is an elevational view of the brake shoe and brake lining assembly.

Fig. 4 is a side elevation of the brake shoe and brake lining assembly.

Fig. 5 is an elevational view of the brake plate and tube retaining channel.

Fig. 6 is a side elevation of the brake plate and tube retaining channel.

Figure 1:
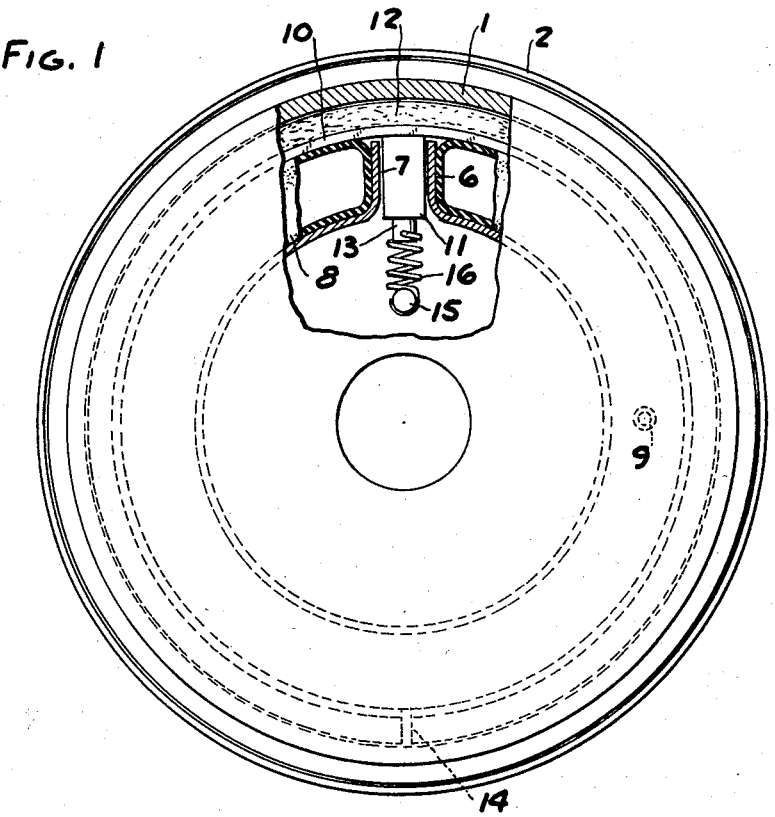
Fig. 1 is an elevational view of the assembly of the brake assembly, partly in section.
Figure 2:
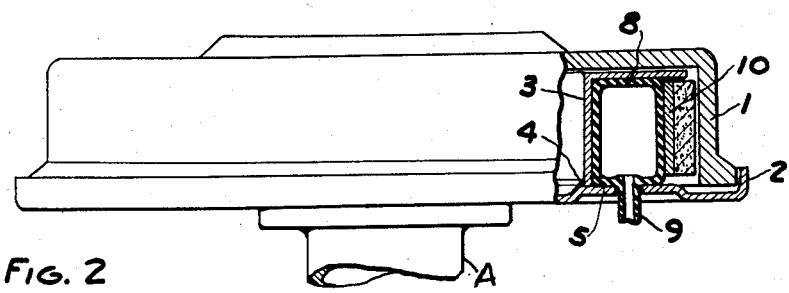
Fig. 2 is a side elevation of the brake assembly, partly in section.

The brake of this invention may be used on any type of equipment on which brakes are used. For illustration purposes I have illustrated the brake in connection with a conventional automobile brake drum 1. Brake plate 2, which is adapted to be fixedly mounted on the axle housing A, has a circular angle piece 3 welded to the inside of plate 2 as at 4, thus forming a channel 5. Channel 5 does not form a complete circle as the ends of angle piece 3, shown at 6, are bent radially outwardly to close ends of channel 5 leaving an opening or clearance space 7. Channel 5 with its closed ends 6 serves as a retainer for a fluid expansible tube 8. Tube 8 is equipped with a stem 9 which is adapted to be connected with tubing from a fluid supplying cylinder and piston unit (not shown).

Brake shoe 10 is manufactured of spring steel and formed with a slightly smaller diameter than its working diameter, thus producing a contracting action when pressure is released from tube 8.

Brake shoe 10 has mounted thereon a radially inwardly extending lug 11 which can move freely in a radial direction through opening 7. Lug 11 is provided at its radially inner end with a retainer 13 for a spring 16.

Brake shoe 10 and lug 11 are assembled to brake lining 12 in a conventional manner. The opening or the distance between the ends of brake shoe 10 shown at 14 is approximately 1/16". At this point the surface of fluid tube 8 is faced with a hard and durable substance.

A spring retainer post 15 is mounted on brake plate 2 and a tension spring 16 is connected between retainers 13 and 15. In operation, when the pressure in tube 8 is relieved, brake shoe 10 contracts and spring 16 maintains the lining 12 out of contact with the braking surface of drum 1. When fluid pressure is applied to tube 8, it expands brake shoe 10, causing lining 11 to move outwardly into frictional contact with the braking surface of drum 1. When the brakes are applied, substantial relative movement between brake shoe 10 and brake plate 2 is prevented by lug 11 which is disposed between the fixed ends 6 of angle member 3.

I claim:
1. A vehicle brake comprising a brake drum having a generally cylindrical braking flange, a brake supporting plate disposed over the open side of said brake drum, means on said brake supporting plate forming an annular, radially outwardly opening channel, said channel being circumferentially continuous from one end to the other around said braking flange and having opposed end portions spaced apart relatively closely circumferentially on said brake supporting plate, a brake shoe surrounding said channel, said brake shoe comprising a radially split, annular spring ring having closely spaced ends, said brake shoe having a lug thereon extending radially inwardly between the opposed ends of said channel, said lug being fixed to said brake shoe at a point generally diametrically opposite the closely spaced ends of the brake shoe, said shoe including a brake liner extending continuously around said ring on the outer side thereof, said spring ring having a normal diameter as increased by the thickness of said liner less than the inner diameter of said cylindrical braking flange, said opposing ends of said channel forming abutments engageable with said lug to prevent substantial relative rotation between the brake shoe and the brake supporting plate, said lug being movable radially in the space between the opposing ends of said channel, a tension spring biasing said lug in a radially inwardly direction to normally hold the shoe out of contact with the braking flange and means in said channel engaging the radially inner side of said brake shoe for expanding the brake shoe into engagement with the brake flange.

2. The combination set forth in claim 1 wherein said means within said channel comprises a fluid expansible tube.

References Cited in the file of this patent
UNITED STATES PATENTS

| | | |
|---|---|---|
| 1,596,286 | Mason | Aug. 17, 1926 |
| 1,711,675 | Fetter | May 7, 1929 |
| 1,774,565 | Price | Sept. 2, 1930 |
| 1,917,671 | Stahl | July 11, 1933 |
| 2,012,663 | Goepfrich | Aug. 27, 1935 |
| 2,098,409 | Whittingham | Nov. 9, 1937 |
| 2,212,422 | Hoppenstand | Aug. 20, 1940 |

FOREIGN PATENTS

| | | |
|---|---|---|
| 471,131 | Germany | Feb. 7, 1929 |
| 325,127 | Italy | Mar. 1, 1935 |